United States Patent [19]

Westhoff

[11] Patent Number: 4,605,389

[45] Date of Patent: Aug. 12, 1986

[54] TOOTHED BELT AND SPROCKET

[75] Inventor: William L. Westhoff, Denver, Colo.

[73] Assignee: The Gates Rubber Company, Denver, Colo.

[21] Appl. No.: 726,254

[22] Filed: Apr. 22, 1985

[51] Int. Cl.⁴ ............................................. F16H 7/02
[52] U.S. Cl. ..................................... 474/153; 474/205
[58] Field of Search ........................ 474/205, 153, 204

[56] References Cited

U.S. PATENT DOCUMENTS 4,515,577 5/1985 Cathey et al. .................. 474/153 X Primary Examiner—James A. Leppink
Assistant Examiner—Frank McKenzie
Attorney, Agent, or Firm—H. W. Oberg, Jr.; C. H. Castleman, Jr.; Frank P. Grassler

[57] ABSTRACT

A toothed power transmission belt with belt teeth having flank surfaces in the form of a tractrix curve and a belt sprocket with sprocket teeth having flank surfaces in the form of a tractrix curve, together, the belt and sprocket exhibiting smooth running and antiratcheting characteristics.

8 Claims, 6 Drawing Figures

TOOTHED BELT AND SPROCKET

BACKGROUND OF THE INVENTION

The invention relates to toothed belts and sprockets, but more particularly, the invention relates to belts with curvilinear flank surfaces and sprockets for use therewith.

Toothed belts are extensively used in synchronous belt drives as substitutes for chain drives or gear trains. Unlike chains and gears that have pitch circles intersecting a point on a gear or sprocket tooth, belt drives have a pitch line that is displaced from both the belt and sprocket teeth and located at the belt tensile member. The displaced pitch line introduces the problem of assuring good entry of a belt tooth into a sprocket cavity with a minimum of interference at various belt loads and sprocket diameters. The belt-tooth/sprocket interference problem is compounded by: belt tooth-to-tooth pitch changes caused by elongation of the belt tensile member; deflection of elastomeric belt teeth; chordal spanning of the belt tensile member at or between sprocket teeth under load; and ratcheting at high-torque conditions on a belt drive where there is initially low static total tension on fixed center drives (i.e., without a means for belt tensioning). A trend in solving some of the belt-tooth/sprocket ratcheting and fit problems under various loadings, is to go from the traditional belt tooth having planar flank surfaces to a belt tooth having curvilinear flank surfaces.

There presently are several commercially available belts that have teeth with curvilinear flank surfaces. Such belts are represented and taught in U.S. Pat. Nos.: 4,452,594 to Patterson; 3,756,091 to Miller; 3,977,265 to Worley et al; and 3,924,481 to Gregg. While such belts offer viable solutions for transmitting power under an assortment of operating conditions, none provide the combined qualities of smooth-running and quietness with a resistance to tooth ratcheting under dynamic conditions, especially for drives with locked sprocket centers and high-tension ratios.

A yet uncommercialized and a theoretical attempt to combine features of smooth-running and antiratcheting is disclosed in U.S. Pat. No. 4,371,363 to Cicognani et al. The Cicognani disclosure does not present a plausible solution because the layout of the tooth profile is dependent on a coefficient for the particular type of elastomeric material forming the belt teeth. Consequently, such a design would not have universal commercial applications because of lack of interchangeability between belts made of different elastomeric material, as for example, belts made of rubber and higher modulus belts made of urethane.

Known belts having good antiratcheting capability under dynamic conditions are characterized by high teeth or teeth with steep flank surfaces, or a combination thereof. The antiratcheting belt exhibits some belt tooth to sprocket interference that usually generates noise with attendant belt vibration or rough-running. In contrast, smooth running belts with little running noise are characterized by shorter belt teeth that have shallower tooth flank surfaces that do not readily scrub against a sprocket.

FIGS. 1 through 4 are tracings of layouts that are computer generated for exactness of fit between belts and sprockets. FIGS. 1 and 2 are illustrative of belts with tooth profiles that inhibit ratcheting because of their larger tooth height to tooth base ratios and steep flank surfaces; however, both belts have attendant scrubbing between the belt teeth and sprocket. FIG. 3 is illustrative of a smooth operating belt with little potential for belt tooth to sprocket scrubbing because of its shallower flank surfaces and lower ratio of tooth height to tooth base; however, the belt exhibits a propensity to ratchet at less torque than the belts of FIGS. 1 and 2.

Referring to FIG. 1, the outline of a Patterson type belt PA having a tooth height H1 to tooth base B1 ratio of about 0.70 overlays a portion of a 32 tooth sprocket 12 to illustrate how the meshing characteristics of the belt depends on the shape of its flank surfaces. While there is no interference with a belt tooth 14 that is fully engaged in a sprocket cavity 16, the belt tooth 18 entering the sprocket groove 20 and belt tooth 22 leaving the sprocket groove 24 have flank surfaces 26, 28 that are so steep that they scrub against the sprocket teeth 30, 32 as is illustrated by the overlapped areas 34, 36. The interference causes noise and may induce unwanted belt vibration during belt operation. However, the belt PA exhibits excellent antiratcheting qualities that are hereafter tabulated in Table 1. If the sprocket teeth were narrowed for the purpose of facilitating tooth entry and exit without interference, as for example, cutting away the overlapped areas 34, 36, the belt would merely translate to a position against the sprocket teeth where there would still be belt tooth interference.

The belt HT as shown in FIG. 2, is a U.S. Pat. No. 3,756,091 type belt having a tooth height H2 to tooth width B2 ratio (i.e., tooth aspect ratio) of about 0.72. The operation of the belt HT is similar to that of the belt PA in that it exhibits similar antiratcheting qualities with some inherent belt tooth interference. While there is no interference with belt tooth 40 that is in full meshing engagement with a sprocket groove 42, a belt tooth 44 entering a sprocket groove 46 or a belt tooth 48 exiting a sprocket groove 50 has flank surfaces 52, 54 that scrub against sprocket teeth 56, 58 to the extent illustrated by the overlapped areas 60, 62. Scrubbing of the belt against the sprocket generates noise and potentially induces belt vibration. The steep flank surfaces in combination with the large aspect ratio (0.72) give the belt HT excellent antiratcheting qualities as comparatively summarized in Table 1.

The prior art belt of the U.S. Pat. No. 3,977,265 Worley et al type (not shown) has a tooth height to tooth base ratio of approximately 0.54; the belt has steep flank surfaces that are similar to the belt HT, which give it good antiratcheting qualities. However, the Worley et al belt has similar belt tooth to sprocket tooth interference problems as illustrated for the belt HT. Ratcheting characteristics of the Worley et al type belt are included in Table 1.

Referring to FIG. 3, a belt ST of the U.S. Pat. No. 3,924,481 type has excellent smooth-running qualities, but poor antiratcheting characteristics due to the combination of its relatively shallower belt tooth flank profile and tooth height H3 to tooth base B3 aspect ratio of approximately 0.58. Just like a belt tooth 66 fully engaged in a sprocket groove 68, a belt tooth 70 entering a sprocket groove 72 or a belt tooth 74 exiting a sprocket groove 76 exhibit no interference between flank surfaces 78, 80 and the sprocket teeth 82, 84. There are no overlapped areas in the vicinity 86, 88 to indicate scrubbing of the belt teeth against the sprocket teeth. Consequently, the belt ST exhibits excellent smoothrunning characteristics with little or no noise.

However, the shallowness of the flank surfaces in combination with its lower tooth aspect ratio contribute to the belts poor antiratcheting qualities that are compared in Table 1.

SUMMARY OF THE INVENTION

In accordance with the invention, a belt and sprocket are provided where the belt when viewed in longitudinal section has teeth with flank surfaces in the form of a tractrix curve (i.e., the involute of a catenary). Similarly, the sprocket has teeth with flank surfaces in the form of a tractrix curve. The specific curve shape of the belt tooth flank surfaces permit the design of a tooth having a tooth height base to base aspect ratio of about 0.66 in combination with a relatively steep flank surfaces to give the belt excellent antiratcheting qualities in combination with substantially little or no tooth scrubbing or interference for smooth operation.

An advantage of the invention is that a belt tooth profile is defined, which exhibits smooth-running in combination with excellent antiratcheting qualities.

These and other advantages of the invention will be more apparent after reviewing the figures in the description thereof wherein:

FIG. 1 is an enlarged partial view, showing a diagram of rack belt teeth in longitudinal section of a U.S. Pat. No. 4,452,594 type belt, the line diagram of belt teeth overlaying a 32 tooth sprocket shown in axial side view where the sprocket teeth are configured to the inverse shape of the same belt when it is convexly bent along its pitch line;

FIG. 2 is a view similar to FIG. 1 but showing a U.S. Pat. No. 3,756,091 type belt with an inversely configured sprocket;

FIG. 3 is a view similar to FIG. 1 but showing a U.S. Pat. No. 3,924,481 type belt with an inversely configured sprocket;

DESCRIPTION OF PREFERRED EMBODIMENT

Figure 5:
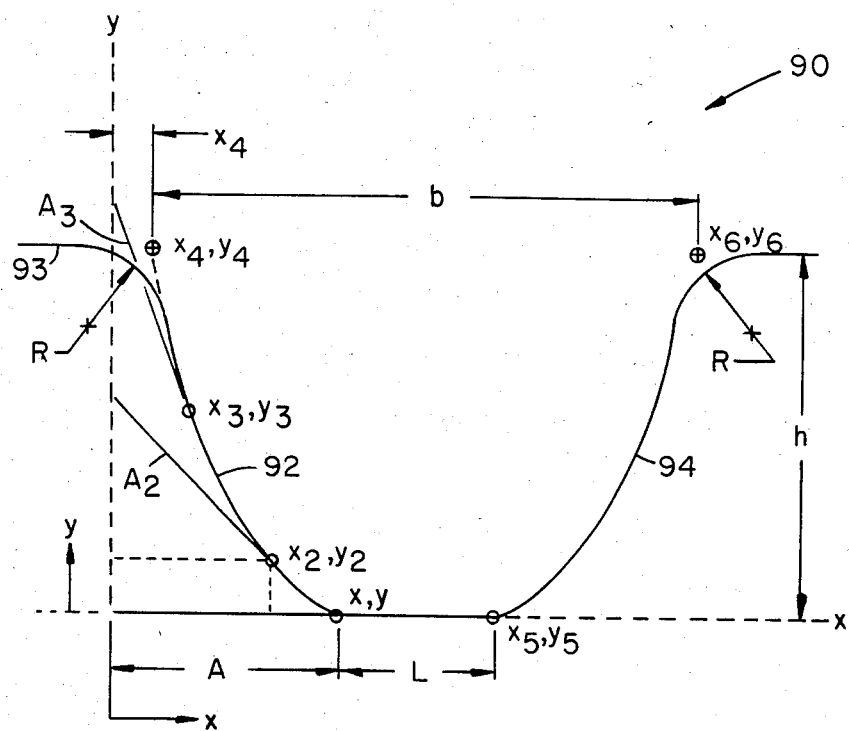
FIG. 5 is a schematic showing how the belt tooth flank surfaces and sprocket tooth flank surfaces are configured to a tractrix curve.

Referring to FIG. 5, a schematic 90 illustrates the formation of tractrix curves 92, 94 as used to generate the profiles of a belt tooth flank surfaces as well as a sprocket tooth flank surfaces when the belt teeth and sprocket teeth are in rack form.

In brief terms, a tractrix curve is defined as the involute of a catenary. A characteristic of a tractrix curve that makes it useful to define a belt tooth profile concerns a portion of a tangent that remains a constant length between its point of contact on the curve and a rectangular coordinate axis. An advantage is that the direction of all the tangents substantially approximate the relative direction of movement of a belt tooth as it enters a sprocket groove without interfering with a sprocket tooth.

The shape of the tractrix curve 92 can be expressed in rectangular coordinates with the following equation:

$$y = A[\ln(A/x + \sqrt{(A/x)^2 - 1}) - \sqrt{1 - (x/A)^2}]$$

where:
the y axis is perpendicular to the belt's longitudinal axis;
the x axis is parallel to the belt's longitudinal axis;
y = the y axis coordinate;
x = the x axis coordinate; and
A = that portion of a tangent that is a constant between a point on the tractrix curve and the y axis.

The tractrix curve 92 starts at a point x, y which corresponds to a point on a belt tooth tip or a point at the bottom of a sprocket groove. In the illustration, the point x is located a distance A from the y axis where the line A also represents a tangent to the curve at point x, y. At point x2, y2, tangent A2 is equal in length to tangent A. As the curve 92 continues, tangent A3 at point x3, y3 is equal in length to tangent A2 and A. The curve continues as shown in dotted form to the point x4, y4 which is on a line 93 that corresponds to the location of a belt tooth land surface or a sprocket tooth tip. The point x4, y4 is located a distance h from the x axis which corresponds to the height of a belt tooth or the depth of the flank surfaces of a sprocket groove. The curve 92 blends into the line 93 by means of a radius R. The tractrix curve 94 is generated in a similar manner starting at point x5, y5 which is spaced a distance L from point x, y. The curve 94 continues to be generated to the point x6, y6 which is spaced a distance b from the point x4, y4. The distance b establishes the base width of a belt tooth or the width of sprocket groove.

Figure 6:
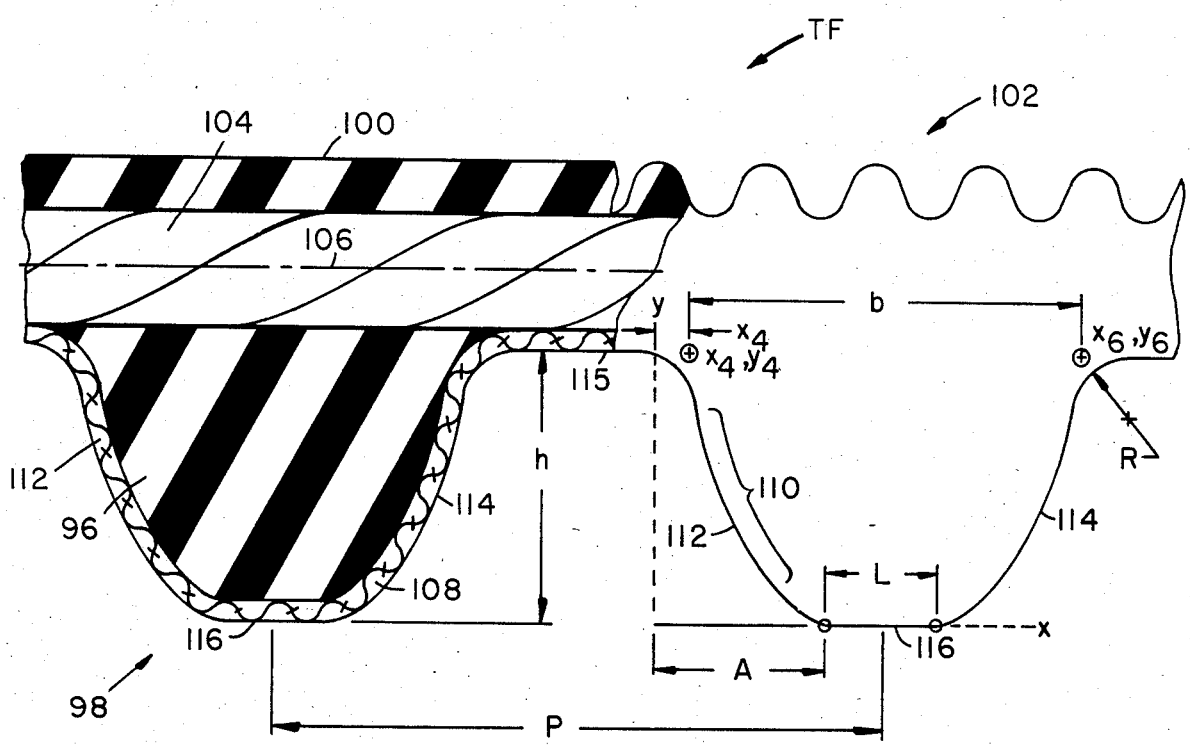
FIG. 6 is a partial longitudinal section view, partially cutaway in cross section, showing a belt of the invention with teeth having flank surfaces configured as a tractrix curve.

Referring to FIG. 6, a toothed power transmission belt TF of the invention is of the type that has an elastomeric body 96 that on one side forms a plurality of belt teeth 98, and on the other side forms a back-layer of any desired shape such as smooth 100 or corrugated 102. The body is molded or cast in known fashion using any suitable elastomer such as natural rubbers, synthetic rubbers, or blends thereof; or the castable elastomers such as polyurethane. A tensile member 104 is disposed in the body and defines a pitch line 106 or longitudinal axis around which bending takes place. The tensile member may be made of any suitable high-modulus material such as spiralled steel cable, fiber glass cord, aramid fiber such as sold under the trademark Kevlar or Kevlar 49, or the like. Fiberous material may optionally be disposed in the belt teeth to enhance their modulus, and optionally, a wear resistant fabric 108 may be disposed in the body as a tooth facing that may also enhance tooth modulus.

In accordance with the invention, each belt tooth has at least that major part 110 of its flank surfaces 112, 114 substantially in the form of a tractrix curve that is generated in the manner as described in conjunction with FIG. 5 while the belt teeth are in rack form. The tractrix curve blends into a land surface 115 by means of a radius R. Similarly, a radius or a continuation of the tractrix curve is used to blend into the belt tooth tips 116, which may have a length L.

The belt teeth are separated by their pitch P and each have a base b and a height h, as viewed in longitudinal section. The steepness of the flank surfaces has an effect on ratcheting and is controlled by the ratio A/h. A preferred ratio of A/h is from 0.550 to 0.900. A more preferred ratio of A/h is from 0.600 to 0.750. A most preferred ratio of A/h is from 0.650 to 0.700.

The depth of the belt tooth, which also has an effect on ratcheting, is controlled by the ratio of h/b. A preferred ratio of h/b is from 0.30 to 1.0. A more preferred ratio of h/b is from 0.45 to 0.85. A most preferred ratio of h/b is from 0.60 to 0.75.

The ratio b/P is partially used to make sure that there is no overlapping interference between a belt tooth and a sprocket during entry or exit. A preferred ratio of b/P is from 0.80 to 0.35. A more preferred ratio of b/P is from 0.75 to 0.45. A most preferred ratio of b/P is from 0.70 to 0.60.

For all of the above given ratios, the quantity b/2 is always greater than the quantity A - x4 to avoid the tractrix curves 92, 94 from theoretically overlapping each other.

The description of the flank surfaces is for the condition where the belt teeth are in rack form when the y axis is perpendicular to the pitch line. When the belt bends, the y axis is no longer perpendicular to the pitch line because it remains in a fixed relationship to the belt tooth.

EXAMPLE 1

To illustrate the effectiveness of the belt tooth profile of the invention along with a mating sprocket, several 14 mm tooth pitch belts were built using the same materials. All belts were built with a urethane body, a nylon fabric tooth facing, and a tensile member of aramid fiber as sold under the trademark Kevlar 49. The belts were built with the previously discussed prior art tooth profiles as well as the profile described for the present invention. The belt of the invention had teeth with tractrix shaped flank surfaces controlled by the ratios: A/h of 0.667; h/b of 0.659; and b/P of 0.650. The counterpart sprocket had ratios: A/h of 0.667; h/b of 0.635; and b/P of 0.675.

All belts were tested for ratcheting by entraining the belts around 32 tooth sprockets and setting the total static drive tension at 60 pounds and then locking the center distance between sprockets. The belts were operated at 1750 r.p.m. and torque was increased until ratcheting occurred. The onset of ratcheting for the various tooth profiles is summarized in Table 1.

TABLE 1

| Belt Type | H/B | Torque, Ft.-lbs |
|---|---|---|
| PA, U.S. 4,452,594 | .70 | 381 |
| HT, U.S. 3,756,091 | .72 | 381 |
| TR, U.S. 3,977,265 | .54 | 175 |
| ST, U.S. 3,924,481 | .58 | 133 |
| TF, this invention | .64 | 362 |

As above summarized, the TF belt of the invention exhibits antiratcheting qualities which significantly are 2.72 times greater than the ST belt, and which approach within 95 percent the antiratcheting characteristics of the HT and PA belts.

Figure 4:
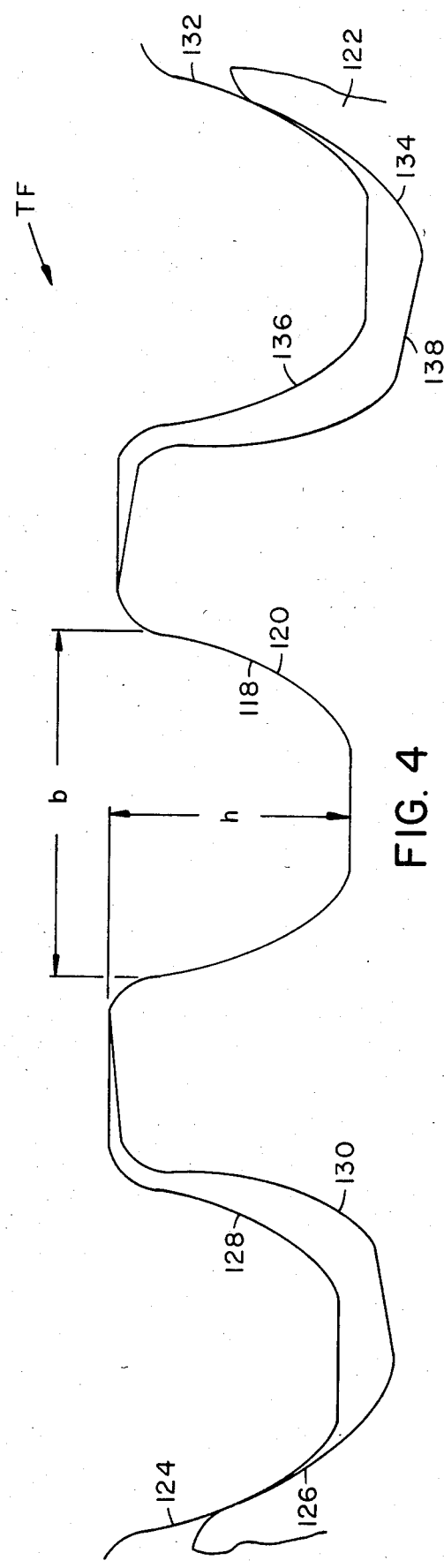
FIG. 4 is a view similar to FIG. 1 but showing a line diagram of the belt teeth of the invention overlaying a 32 tooth sprocket of the invention.

The belt TF of the invention also exhibits smoothrunning characteristics because there is no inherent interference between the belt teeth and sprocket as is illustrated by FIG. 4. Belt tooth 118 with its h to b ratio of 0.659 is shown fully engaged in a groove 120 of a sprocket 122. There is even contact and substantially tangential sliding contact between the belt tooth flank surface 124 and the sprocket tooth 126 as belt tooth 128 enters the sprocket groove 130. Similarly, there is even contact and substantially tangential sliding contact between the belt tooth flank surface 132 against the sprocket tooth 134 as belt tooth 136 exits sprocket groove 138 and consequently, the belt of the invention is smoothrunning.

For illustrative purposes, FIG. 4 shows a sprocket groove exactly configured to the belt tooth. As above explained with the ratios for the 14 mm pitch sprocket, it is desirable that the belt sprocket have a little bit larger groove than the belt tooth. This is accomplished by means of making the sprocket groove width from about 0.5 to about 10 percent greater than the belt tooth width which corresponds to the following ratios for shaping the sprocket teeth:

preferred A/h of from 0.550 to 0.900;
more preferred A/h of from 0.600 to 0.750;
most preferred A/h of from 0.650 to 0.700;

preferred A/b of from 0.273 to 0.995;
more preferred h/b of from 0.109 to 0.846;
most preferred h/b of from 0.545 to 0.746;

preferred b/P of from 0.880 to 0.352;
more preferred b/P of from 0.825 to 0.452; and
most preferred b/P of from 0.770 to 0.603.

Figure 1:
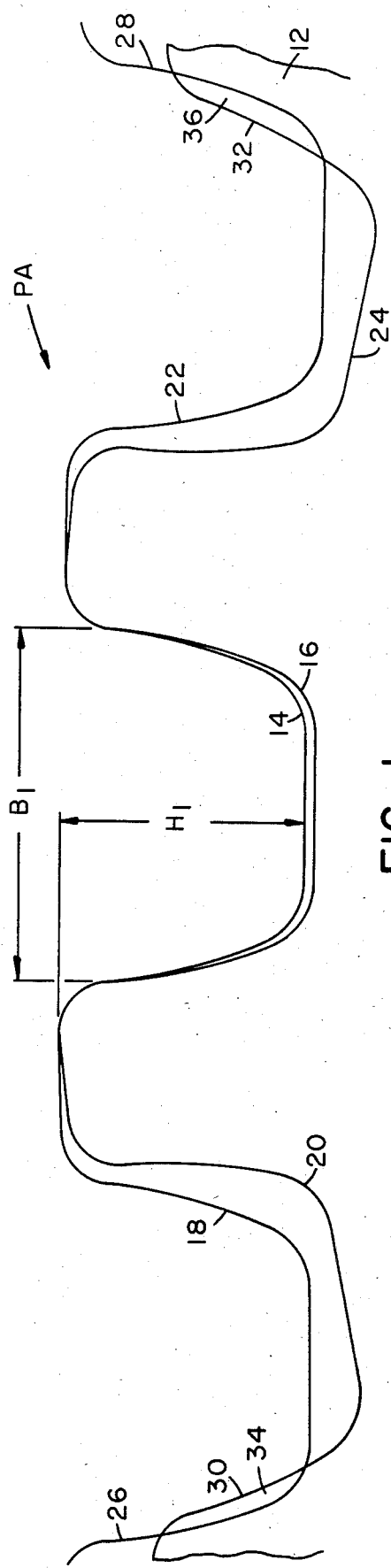
Figure 2:
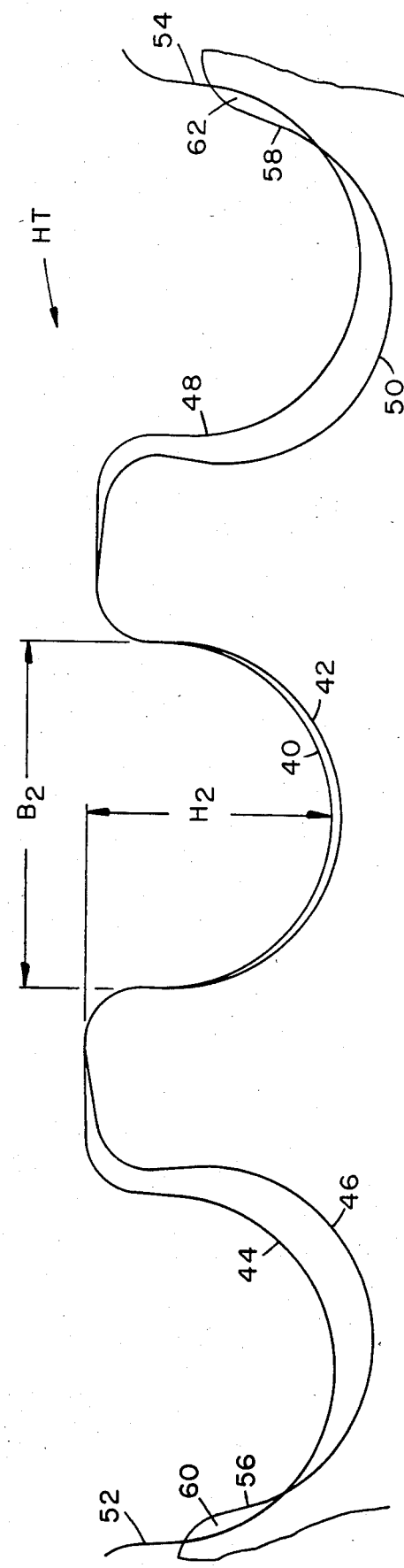
Figure 3:
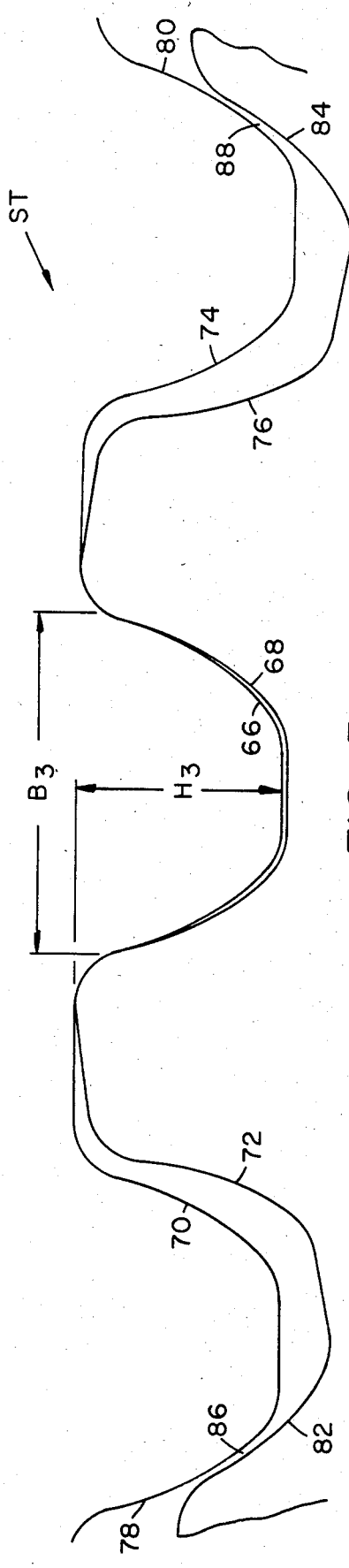

In summary, the tractrix profile of the flank surfaces of the belt of the invention permits the design of a high belt tooth with tangential sliding and even contact as the belt tooth enters or exits a sprocket. Such operation is unachievable with the limitations of the prior art belt designs. The ST belt of FIG. 3 is limited to shallow tooth flank surfaces and minimum tooth height, because the flank surfaces are governed by a radius that is equal to the tooth width. The PA belt of FIG. 1 and HT belt of FIG. 2 have inherent interference, which induces rough-running.

The foregoing description is made for the purpose of illustration only and it is not intended to limit the scope of the invention, which is to be determined from the appended claims.

What is claimed is:

1. In a toothed power transmission belt of the type formed with an elastomer, reinforced with a tensile member that defines a pitch line, and teeth that when viewed in longitudinal section each have a base width b, a height h, a pitch spacing P and oppositely facing flank surfaces that change at roots into land surfaces and also change into a tooth tip, wherein the improvement comprises:

each belt tooth having a major portion of each flank surface shaped in longitudinal section as substantially a tractrix curve.

2. The power transmission belt as claimed in claim 1 wherein the tractrix curve is defined by the formula:

$$y = A[\ln(A/x + \sqrt{(A/x)^2 - 1}\,) - \sqrt{1 - (x/A)^2}\,]$$

where while the belt is in rack form:
y is a coordinate of a y axis that is perpendicular to the pitch line;
x is a coordinate of an x axis that is parallel to the pitch line; and
A is line tangent to the curve and of constant length between its point of tangency and the y axis;
and wherein the tractrix curve is characterized by the ratio ranges of:
A/h from about 0.550 to about 0.900;

h/b from about 0.30 to about 1.00; and
b/P from about 0.80 to about 0.35.

3. The power transmission belt as claimed in claim 2 wherein the tractrix curve is characterized by the ratio ranges of:
A/h from about 0.650 to about 0.700;
h/b from about 0.60 to about 0.750; and
b/P from about 0.70 to about 0.60.

4. In a belt sprocket of the type having a plurality of circumferentially spaced teeth, that when viewed in axial side view, each have oppositely facing flank surfaces that change into a sprocket tooth tip and also change into a groove bottom, the teeth when in rack form having a pitch line spacing P, and a spacing b between facing flank surfaces of successive teeth at the sprocket tooth tips, and the facing flank surfaces of successive teeth defining a groove having a depth h, wherein the improvement comprises:
each sprocket tooth having a major portion of each of its flank surfaces shaped in longitudinal section as substantially a tractrix curve.

5. The belt sprocket as claimed in claim 4 wherein the tractrix curve is defined by the formula:

$$y = A[\ln(A/x + \sqrt{(A/x)^2 - 1}) - \sqrt{1 - (x/A)^2}]$$

where while the sprocket is in rack form:
y is a coordinate of a y axis that is perpendicular to the pitch line;
x is a coordinate of an x axis that is parallel to the pitch line; and
A is line tangent to the curve and of constant length between its point of tangency and the y axis;
and wherein the tractrix curve is characterized by the ratio ranges of:
A/h from about 0.550 to about 0.900;
h/b from about 0.273 to about 0.995; and
b/P from about 0.880 to about 0.352.

6. The belt sprocket as claimed in claim 5 wherein the tractrix curve is characterized by the ratio ranges of:
A/h from about 0.650 to about 0.700;
h/b from about 0.545 to about 0.746; and
b/P from about 0.770 to about 0.603.

7. The combination of (A) a toothed power transmission belt of the type formed with an elastomer, reinforced with a tensile member that defines a pitch line, and teeth that when viewed in longitudinal section each have a base width b, a height h, a pitch spacing P and oppositely facing flank surfaces that change at roots into land surfaces and also change into a tooth tip wherein each belt tooth has a major portion of each flank surface shaped in longitudinal section as substantially a tractrix curve and (B) a sprocket having spaced sprocket teeth with flank surfaces that define belt tooth receiving grooves, the sprocket tooth flank surfaces shaped as a tractrix curve that substantially compliments the shape of the belt tooth flank surfaces.

8. The power transmission belt as claimed in claim 7 wherein the tractrix curve for the belt flank surfaces is defined by the formula:

$$y = A[\ln(A/x + \sqrt{(A/x)^2 - 1}) - \sqrt{1 - (x/A)^2}]$$

where while the belt is in rack form:
y is a coordinate of a y axis that is perpendicular to the pitch line;
x is a coordinate of an x axis that is parallel to the pitch line; and
A is line tangent to the curve and of constant length between its point of tangency and the y axis;
and wherein the tractrix curve is characterized by the ratio ranges of:
A/h from about, 0.550 to about 0.900;
h/b from about 0.30 to about 1.00; and
b/P from about 0.80 to about 0.35.

* * * * *